INVENTORS
MASAO TAKAHASHI
FUMIO YAMAUCHI
NORIO TSUBOUCHI
TOMEJI OHNO
TSUNEO AKASHI
BY
Hopgood & Calimafde
ATTORNEYS.

INVENTORS.
MASAO TAKAHASHI
FUMIO YAMAUCHI
NORIO TSUBOUCHI
TOMEJI OHNO
TSUNEO AKASHI
BY
Hopgood & Calimafde
ATTORNEYS.

INVENTORS.
MASAO TAKAHASHI
FUMIO YAMAUCHI
NORIO TSUBOUCHI
TOMEJI OHNO
TSUNEO AKASHI
BY
Hopgood & Calimafde
ATTORNEYS.

INVENTORS
MASAO TAKAHASHI
FUMIO YAMAUCHI
NORIO TSUBOUCHI
TOMEJI OHNO
TSUNEO AKASHI
BY
Hopgood & Calimafde
ATTORNEYS.

United States Patent Office 3,461,071
Patented Aug. 12, 1969

3,461,071
PIEZOELECTRIC CERAMIC COMPOSITION

Tsuneo Akashi, Masao Takahashi, Norio Tsubouchi, Tomeji Ohno, and Fumio Yamauchi, Tokyo, Japan, assignors to Nippon Electric Company Limited, Tokyo, Japan, a corporation of Japan Filed Sept. 2, 1965, Ser. No. 484,636
Claims priority, application Japan, Sept. 3, 1964, 39/50,522; Sept. 11, 1964, 39/51,971
Int. Cl. C04b *35/36*
U.S. Cl. 252—62.9 3 Claims

ABSTRACT OF THE DISCLOSURE

Piezoelectric ceramic of the general formula $$Pb(Zr_xTi_ySn_z)O_3$$

Figure 1:
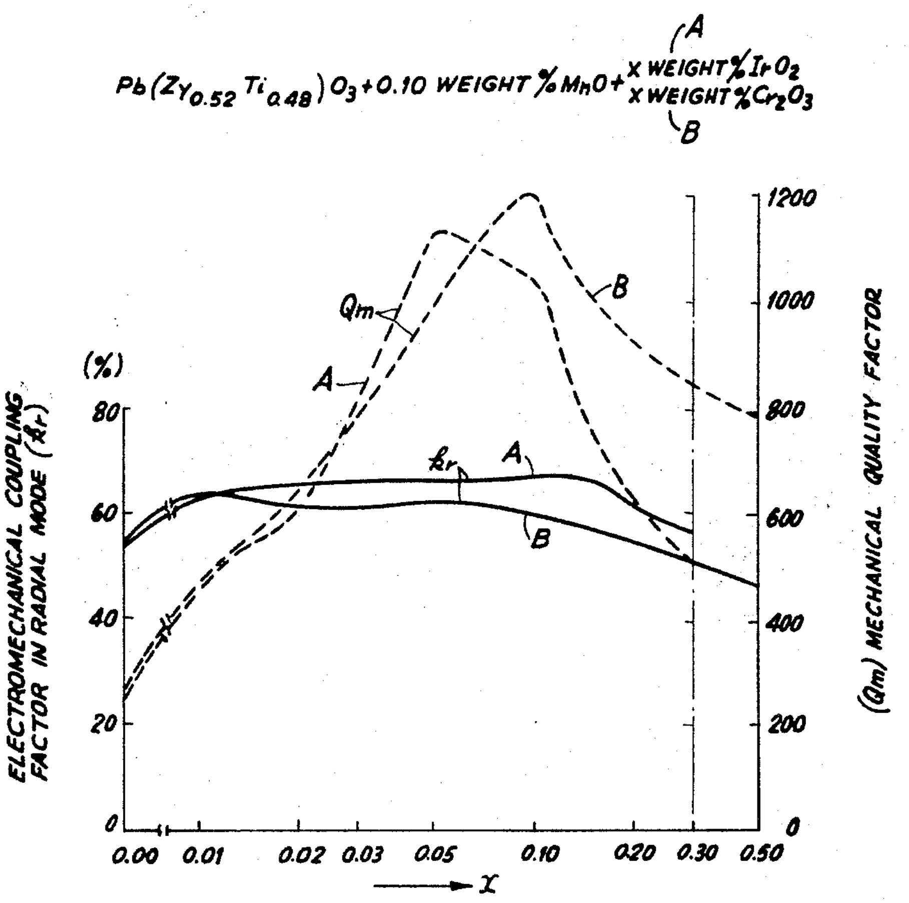

where the subscripts denote mole fractions and have the following values: $x$=0–.9, $y$=.1–.6, $z$=0–.65, and $x+y+z=1.00$, are improved by two coexistent additives; the first being .01 to .50 weight percent manganese monoxide (MnO) and the second selected from the group of .01 to .30 weight percent iridium dioxide ($IrO_2$) and .01 to .50 weight percent chromium sesquioxide ($Cr_2O_3$).

This invention relates generally to piezoelectric ceramic materials, and in particular to novel lead titanate zirconate base ceramics characterized by the incorporation of manganese monoxide (MnO) and one of iridium dioxide ($IrO_2$) and chromium sesquioxide ($Cr_2O_3$) as two coexistent additive agents.

It is the object of this invention to improve both the electromechanical coupling and the mechanical quality factors of piezoelectric ceramics.

It is well known that a solid solution of lead titanate zirconate [$Pb(ZrTi)O_3$], produced by mixing together lead zirconate ($PbZrO_3$) and lead titanate ($PbTiO_3$) and sintering the mixture, exhibits enhanced piezoelectric properties, excellent temperature and time stability, and that the most salient piezoelectric properties are exhibited in the vicinity of $x$=0.52–0.54 for a generalized formula $$Pb(Zr_xTi_{1-x})O_3$$

It is also known that the basic criteria for assessing the merits of piezoelectric ceramic materials are the electromechanical coupling factor $k_r$ and the mechanical quality factor $Q_m$. The former indicates the conversion efficiency in converting mechanical oscillation to electrical oscillation and vice versa while the latter indicates the order of the energy consumed within the ceramic material in the oscillation conversion; the larger the value of the mechanical quality factor, the less the amount of energy consumed.

Ceramic filters using piezoelectric ceramics as elements and mechanical filters using the same as transducers have been the subject of considerable recent research. The characteristics of piezoelectric ceramics called for in these applications may be summed up as follows:

The electromechanical coupling factor of any ceramic filter element may maintain any designated value ranging from an extremely small value to an extremely large value and at the same time, the mechanical quality factor of the element must be as large as possible. When utilized as a transducer element, it is desirable that both the electromechanical coupling factor and the mechanical quality factor be as large as possible. In other words, the characteristics required for a transducer element conform to the characteristics of materials for ceramic filter elements having particularly large electromechanical coupling factors.

Although the principal constituent components contemplated by this invention are lead titanate zirconate the effect of coexistence of manganese monoxide anc iridium dioxide (chromium sesquioxide) as two additive: would remain the same even if 25 atom percent or les: lead in the lead titanate zirconate is replaced with an; one or a combination of any two or all of calcium, stron tium, and barium; and/or 65 atom percent or less of th sum of titanium and zirconium is replaced with tin. Thes are substitutions well known to the art. Accordingly when hereinafter the term "principal consituent compo nents" is used or lead titanate zirconate is being describe as a component, it will be appreciated that the descriptio applies equally to one in which either or both of th foregoing substitutions has been made. For further de tails of such substitutions, reference may be made to treatise by B. Jaffe, R. S. Roth, and S. Marzullo in th Journal of Research of the National Bureau of Standards 55 (1955), page 239, and U.S. Patent No. 3,068,177.

It may be said therefore that this invention pertains t novel piezoelectric ceramic materials having essentiall the constituency indicated by the generalized formula $$Pb(Zr_xTi_ySn_z)O_3$$

wherein the subscripts denote mole fractions and hav the following value:

$x$=0.00–0.90
$y$=0.10–0.60
$z$=0.00–0.65
$x+y+z=1.00$ and, if required or desired, 25 atom percent or less lea is replaced with at least one of calcium, strontium, an barium; characterized by two co-existent additives as wi be described.

It will be further apparent to those skilled in the a that the improvements in the characteristics ($k_r$ and $Q_m$ caused by the incorporation of manganese monoxide an iridium dioxide (chromium sesquioxide) are due to mar ganese and iridium (chromium) ions present in lea titanate zirconate base ceramics. (Since iridium and chrc mium compounds are alternative second additive agent for convenience, the latter will be parenthetically recite to demonstrate that the use of either with manganes compounds is intended.) Accordignly, manganese con pounds other than MnO (e.g., $MnCO_3$ or $MnO_2$) may b employed; the only requisite being that such a compoun needs to contain the equivalent weight of manganes ions. Likewise, in incorporating an iridium compoun other than $IrO_2$ (such as $IrCl_3$ or $Ir_2O_3$) as a chromiu compound other than $Cr_2O_3$ (e.g., $Cr_2(SO_4)_3$ or $CrO_3$ such compounds need to contain the equivalent weigl of ions.

The above mentioned and other features and objec of this invention and the manner of attaining them wi become more apparent and the invention itself will be be understood by reference to the following descriptic of embodiments of the invention taken in conjunctic with the accompanying drawings wherein:

FIG. 1 graphically illustrates the electromechanic coupling and mechanical quality factors characterist of the piezoelectric ceramics of the invention with o additive constant.

Figure 2:
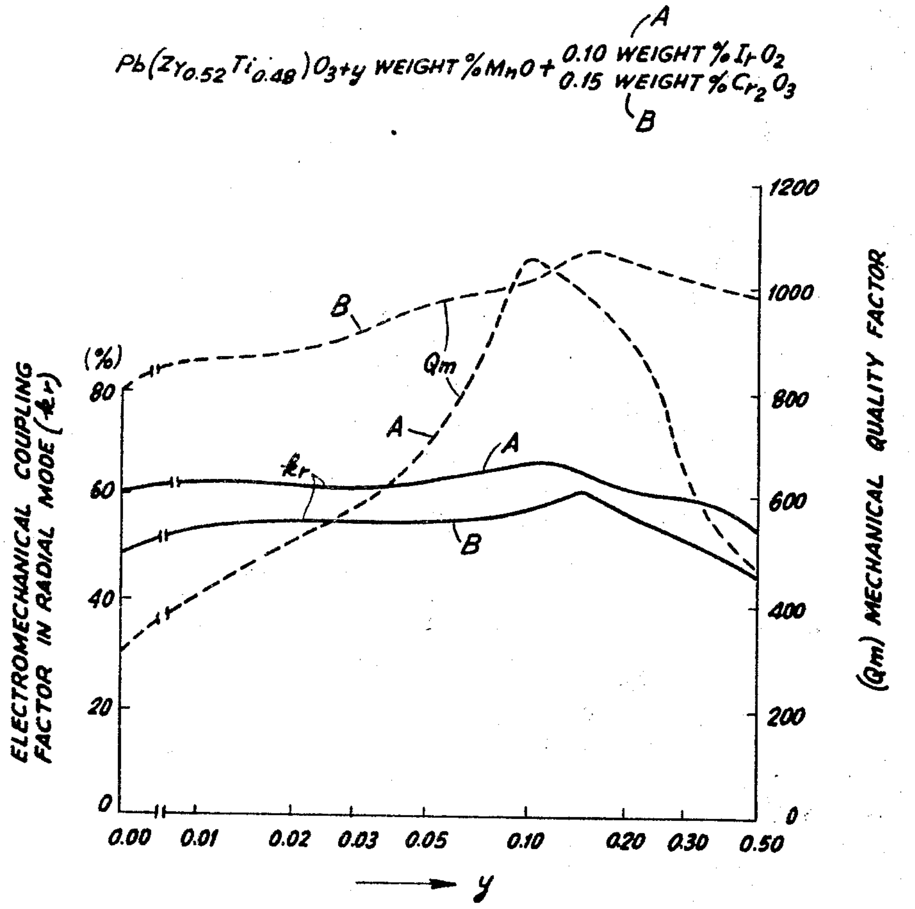

FIG. 2 graphically illustrates the electromechanic coupling and mechanical quality factors characterist of the piezoelectric ceramics of the invention with t other additive consatnt.

Figure 3:
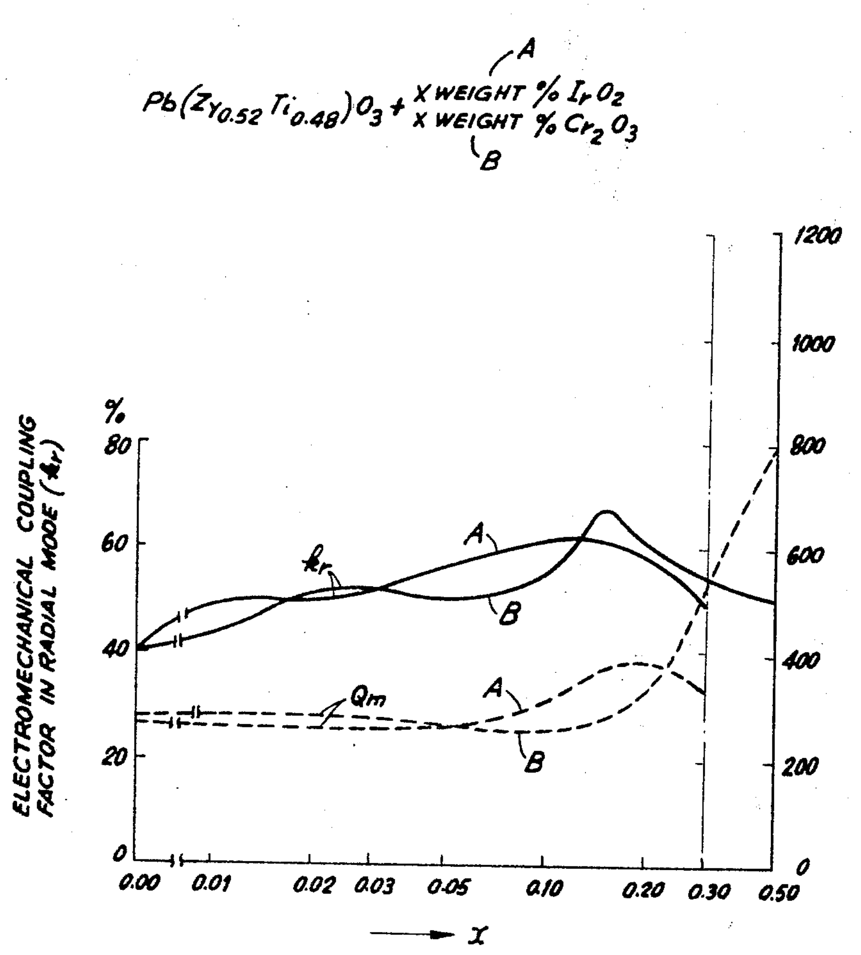

FIG. 3 graphically illustrates the electromechanic coupling and mechanical quality factors characterist of a piezoelectric ceramic with one variable additi alone.

Figure 4:
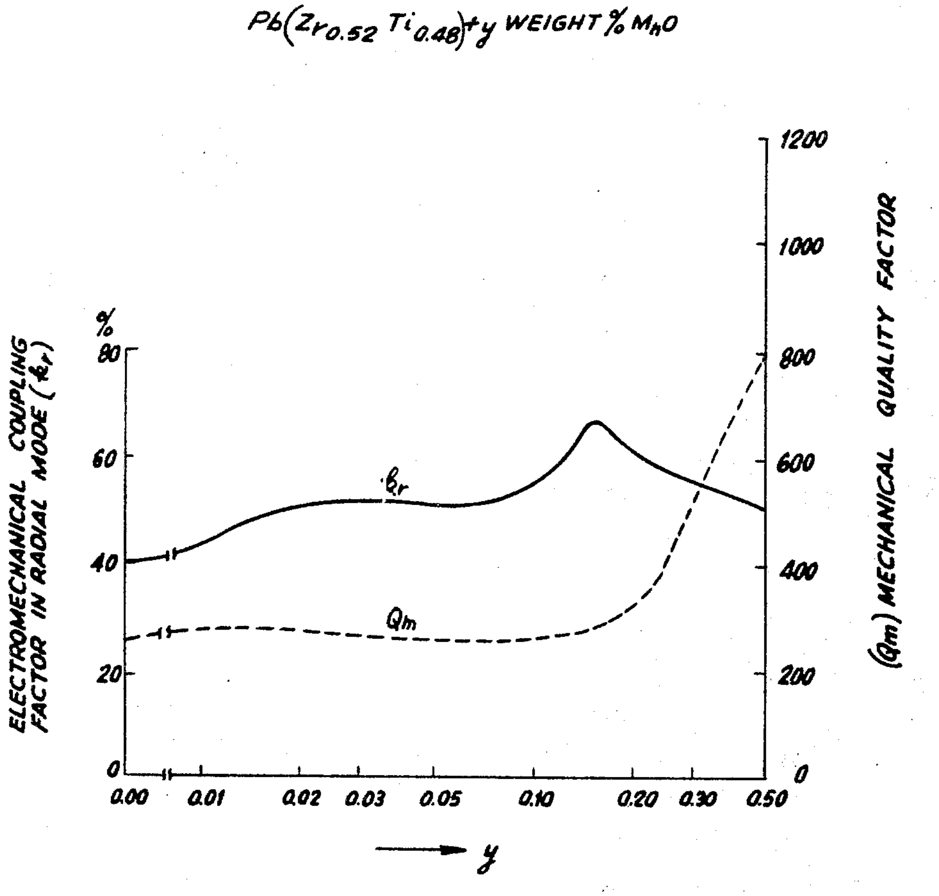

FIG. 4 graphically illustrates the electromechanic coupling and mechanical quality factors characterist of a piezoelectric ceramic with the other variable additive alone.

The curves in FIG. 1 show the electromechanical coupling factor (abbreviated $k_r$) in radial mode and the mechanical quality factor (abbreviated $Q_m$) of piezoelectric ceramics having the principal constituent components expressed as $Pb(Zr_{0.52}Ti_{0.48})O_3$ and incorporating as the two additive agents 0.10 weight percent MnO, and: curve A—less than 0.30 weight percent $IrO_2$ in varying amounts as the variable; and curve B—less than 0.50 weight percent $Cr_2O_3$ as the variable.

It was experimentally verified that the values of $k_r$ and $Q_m$ for plain or unmodified lead titanate zirconate subjected to poling at room temperature were 41% and 270, respectively and that the corresponding values for the same ceramic subjected to poling at 100° C. were 42% and 250. FIG. 1 manifests that the incorporation of only 0.1 weight percent MnO contributes markedly to improvements in the piezoelectric characteristics and that incorporation of both MnO and $IrO_2$ or $Cr_2O_3$ contributes to much greater improvements.

Incorporation of $IrO_2$ in excess of 0.30 weight percent impairs formation of a solid solution of lead titanate zirconate and $IrO_2$, resulting in lowering of the electrical resistivity and impracticability of poling. Therefore, the effective range for incorporation of $IrO_2$ is restricted to 0.30 or less ewight percent (0.00 wt. percent is excluded). For similar reasons and reasons apparent from FIG. 1, the effective range of $Cr_2O_3$ is limited to 0.50 weight percent (0.00 wt. percent excluded).

FIG. 2 demonstrates the fact that the values of $k_r$ and $Q_m$ of a lead titanate zirconate ceramic containing only 0.10 weight percent $I_rO_2$ (0.15 weight percent $Cr_2O_3$) have been remarkably improved over the corresponding values of $k_r$ and $Q_m$ of a plain lead titanate zirconate ceramic expressed as $Pb(Zr_{0.52}Ti_{0.48})O_3$. It also demonstrates that more excellent piezoelectric properties can be secured under coexistence of $IrO_2$ ($Cr_2O_3$) and MnO.

Further, improvements in the characteristics due to coexistence of the two additive agents cannot be expected where MnO exists in more than 0.50 weight percent. This is to say, the existence of the second addiitve $IrO_2$ ($Cr_2O_3$) in the presence of more than 0.50 weight percent MnO as the first additive does not materially improve the characteristics because the characteristics have been fully affected by the first additive and stabilized. In other words, the coexistence of MnO and $IrO_2$ ($Cr_2O_3$) becomes of no further significance. For this reason the range of effective incorporation of MnO has been restricted to 0.50 or less weight percent (0.00 weight percent is excluded).

The curves in FIG. 3 show dependence of $k_r$ and $Q_m$ of piezoelectric ceramics consisting of a lead titanate zirconate expressed as $Pb(Zr_{0.52}Ti_{0.48})O_3$ and less than 0.30 weight percent $IrO_2$ (0.50 weight percent $Cr_2O_3$) in varying amounts on the amount of $IrO_2$ ($Cr_2O_3$) taken as the variable.

The curves in FIG. 4 show dependence of $k_r$ and $Q_m$ of piezoelectric ceramics consisting of a lead titanate zirconate expressed as $Pb(Zr_{0.52}Ti_{0.48})O_3$ and less than 0.50 weight percent MnO in varying amounts on the amount of MnO taken as the variable.

The more detailed description which follows further clarifies the invention and the relationship between the embodiments.

Lead oxide (PbO), zirconium oxide ($ZrO_2$) and titanium oxide ($TiO_2$) were mixed in the ratio of 50:26:24 mole percent so that the principal constituent components may be expressed as $Pb(Zr_{0.52}Ti_{0.48})O_3$ and to this, required amounts of manganese monoxide (MnO) and iridium dioxide ($IrO_2$) were added. The mixture was thoroughly mixed in a ball mill, preheated at 900° C. for one hour, pulverized, and pressed to form disc-shaped samples. The samples were then sintered at 1300° C. for one hour and a pair of silver electrodes were installed on the opposite surfaces of each disc. Then the samples were subjected to poling either at room temperature or at 100° C. by applying a voltage of 50 kv./cm. The samples were then left standing in the air for twenty-four hours and the values of $k_r$ and $Q_m$ of these ultimate products measured.

Normally, poling is performed at room temperature or at temperatures in excess of room temperature. In conducting these experiments, therefore, 100° C. was selected as a typical temperature above room temperature. Where the result was the same regardless of poling temperature, only one poling temperature will be described.

It is to be noted that (as will be seen from the tables) alternative ion sources were selected to illustrate the equivalency of additives (e.g., in some cases $MnCO_3$ was used instead of MnO).

Table I shows the values of $k_r$ and $Q_m$ for ceramics consisting of plain lead titanate zirconate, lead titanate zirconate and 0.10 weight percent MnO, and lead titanate zirconate, 0.10 weight percent MnO, and less than 0.30 weight percent $IrO_2$ in varying amounts, respectively.

TABLE I

| No. | Compositional formula | Poling temperature | $k_r$ Percent | $Q_m$ |
|---|---|---|---|---|
| 1 | $Pb(Zr_{0.52}Ti_{0.48})O_3$ | Room temp | 41 | 270 |
| | | 100° C | 42 | 250 |
| 2 | $Pb(Zr_{0.52}Ti_{0.48})O_3$ plus 0.10 wt. percent MnO. | Room temp | 48 | 250 |
| | | 100° C | 55 | 260 |
| 3 | $Pb(Zr_{0.52}Ti_{0.48})O_3$ plus 0.10 wt. percent MnO plus 0.01 wt. percent $IrO_2$. | Room temp | 50 | 500 |
| | | 100° C | 64 | 470 |
| 4 | $Pb(Zr_{0.52}Ti_{0.48})O_3$ plus 0.10 wt. percent MnO [1] plus 0.02 wt percent $IrO_2$. [1] | Room temp | 42 | 640 |
| | | 100° C | 65 | 600 |
| 5 | $Pb(Zr_{0.52}Ti_{0.48})O_3$ Plus 0.10 wt. percent MnO plus 0.05 wt. percent $IrO_2$ [3]. | Room temp | 43 | 360 |
| | | 1100° C | 66 | 1,140 |
| 6 | $Pb(Zr_{0.52}TI_{0.48})O_3$ plus 0.10 wt. percent MnO [1] plus 0.10 wt. percent $IrO_2$. | Room temp | 67 | 1,060 |
| 7 | $Pb(Zr_{0.52}Ti_{0.48})O_3$ plus 0.10 wt. percent MnO plus 0.15 wt. percent $IrO_2$. | Room temp | 67 | 730 |
| 8 | $Pb(Zr_{0.52}Ti_{0.48})O_3$ plus 0.10 wt. percent MnO [2] plus 0.20 wt. percent $IrO_2$. | Room temp | 62 | 630 |
| 9 | $Pb(Xr_{0.52}Ti_{0.48})O_3$ plus 0.10 wt. percent MnO plus 0.30 wt. percent $IrO_2$. | Room temp | 56 | 500 |

[1] 0.10 wt. percent MnO was incorporated.

[2] $MnO_2$ equivalent in amounts to 0.10 wt. percent Mno was incorpora ted.

[3] $Ir_2O_3$ equivalent in amounts to 0.05 wt. percent $IrO_2$ was incorporated.

TABLE II

| No. | Compositional formula | Poling temperature | $k_r$ Percent | $Q_m$ |
|---|---|---|---|---|
| 1′ | $Pb(Zr_{0.52}Ti_{0.48})O_3$ | Room temp | 41 | 270 |
| | | 100° C | 42 | 250 |
| 2′ | $Pb(Zr_{0.52}Ti_{0.48})O_3$ plus 0.10 weight percent MnO. | Room temp | 48 | 250 |
| | | 100° C | 55 | 260 |
| 3′ | $Pb(Zr_{0.52}Ti_{0.48})O_3$ plus 0.10 weight percent MnO plus 0.01 weight percent Cr203. | Room temp | 44 | 460 |
| | | 100° C | 63 | 470 |
| 4′ | $Pb(Zr_{0.52}Ti_{0.48})O_3$ plus 0.10 weight percent $MnO_1$ plus 0.02 wt. percent Cr203. | Room temp | 41 | 560 |
| | | 100° C | 61 | 640 |
| 5′ | $Pb(Zr_{0.52}Ti_{0.48})O_3$ plus 0.10 wt. percent MnO plus 0.05 wt. percent Cr203. | Room temp | 37 | 820 |
| | | 100° C | 62 | 1,000 |
| 6′ | $Pb(Zr_{0.52}Ti_{0.48})O_3$ plus 0.10 wt. percent MnO plus 0.10 wt. percent Cr203. | Room temp | 45 | 1,110 |
| | | 100° C | 59 | 1,200 |
| 7′ | $Pb(Zr_{0.52}Ti_{0.48})O_3$ plus 0.10 wt. percent MnO [2] plus 0.15 wt. percent Cr203. | Room temp | 46 | 980 |
| | | 100° C | 57 | 1,010 |
| 8′ | $Pb(Zr_{0.52}Ti_{0.48})O_3$ plus 0.10 wt. percent MnO plus 0.20 wt. percent Cr203. | Room temp | 54 | 930 |
| 9′ | $Pb(Zr_{0.52}Ti_{04.8})O_3$ plus 0.10 wt. percent MnO plus 0.50 wt. percent Cr203. | Room temp | 46 | 780 |

[1] Denotes incorporation of $MnO_2$ in amounts equivalent to MnO.

[2] Denoted incorporation in the form of MnO instead of $MnO_2$.

A comparison between samples No. 1 and No. 2 shows that incorporation of merely 0.10 weight percent MnO contributes appreciably to improvements in the value of $k_r$. Further, a comparison between samples No. 3 through No. 9 and sample No. 1 or No. 2 demonstrates that both $k_r$ and $Q_m$ are improved markedly in the presence of both MnO and $IrO_2$ as coexistent additives. These embodiments also indicate that these materials, notably No. 3 through No. 9, are eminently suitable for ceramic filter materials for which large values of $k_r$ are necessary or for transducer materials. It can further be noted that in the range where the incorporation of $IrO_2$ is small (such as samples No. 3 through No. 5) the value of $k_r$ is markedly improved by poling at 100° C.

Table II illustrates similar results are attainable with $Cr_2O_3$ rather than $IrO_2$ as the second additive. From this table it may be seen that samples No. 3′ through No. 7′ subjected to poling at 100° C. would be excellent for ceramic filter elements for which particularly large values of $k_r$ are called or for transducer elements in mechanical filters and that samples No. 3′ through No. 9′ subjected to poling at room temperature could be adapted for ceramic filter elements for which extremely large values of $Q_m$ and values of $k_r$ of this order are necessary.

Table III shows the experimental result obtained with $Pb(Zr_{0.52}Ti_{0,48})O_3$, 0.10 weight percent $IrO_2$, and less than 0.50 weight percent MnO in varying amounts.

TABLE III

| No. | Compositional formula | Poling temperature | $k_r$ Percent | $Q_m$ |
|---|---|---|---|---|
| 10 | $Pb(Zr_{0.52}Ti_{0.48})O_2$ plus 0.10 wt. percent $IrO_2$. | Room temp.<br>100° C. | 52<br>62 | 320<br>310 |
| 11 | $Pb(Zr_{0.52}Ti_{0.48})O_3$ plus 0.01 wt. percent MnO plus 0.10 wt. percent $IrO_2$. | Room temp.<br>100° C. | 57<br>63 | 400<br>410 |
| 12 | $Pb(Zr_{0.52}Ti_{0.48})O_3$ plus 0.02 wt. percent MnO[1] plus 0.10 wt. percent $IrO_2$. | Room temp.<br>100° C. | 59<br>62 | 560<br>520 |
| 13 | $Pb(Zr_{0.52}Ti_{0.48})O_3$ plus 0.05 wt. percent MnO plus 0.10 wt. percent $IrO_2$.[4]. | Room temp. | 63 | 700 |
| 14 | $Pb(_{0.52}Ti_{0.48})O_3$ plus 0.20 wt. percent MnO plus 0.10 wt. percent $IrO_2$. | Room temp. | 61 | 930 |
| 15 | $Pb(Zr_{0.52}Ti_{0.48})O_3$ plus 0.30 wt. percent $MnO_3$ plus 0.10 wt. percent $IrO_2$. | Room temp. | 61 | 640 |
| 16 | $Pb(Zr_{0.52}Ti_{0.48})O_3$ plus 0.50 wt. percent MnO[3] plus 0.10 wt. percent IrO[2]. | Room temp. | 54 | 490 |

[1] 0.02 wt. percent MnO was incorporated.
[2] $MnO^2$ was incorporated equivalent in amounts to 0.30 wt. percent MnO.
[3] 0.50 wt percent MnO incorporated.
[4] $IrO_3$ incorporated in amounts equivalent to 0.10 wt. percent $IrO_2$.

TABLE IV

| No. | Compositional formula | Poling temperature | $k_r$ Percent | $Q_m$ |
|---|---|---|---|---|
| 10′ | $Pb(Zr_{0.52}Ti_{0.48})O_3$ plus 0.15 wt. percent $Cr_2O_3$. | Room temp.<br>100° C. | 47<br>50 | 750<br>760 |
| 11′ | $Pb(Zr_{0.52}Ti_{0.48})O_3$ plus 0.01 wt. percent MnO plus 0.15 wt. percent $Cr_2O_3$. | Room temp.<br>100° C. | 52<br>53 | 780<br>850 |
| 12′ | $Pb(Zr_{0.52}Ti_{0.48})O_3$ plus 0.02 wt. percent MnO plus 0.15 wt. percent $Cr_2O_3$. | Room temp.<br>100° C. | 54<br>55 | 820<br>860 |
| 13′ | $Pb(Zr_{0.52}Ti_{0.48})O_3$ plus 0.05 wt. percent MnO[1] plus 0.15 wt. percent $Cr_2O_3$. | Room temp.<br>100° C. | 53<br>55 | 950<br>960 |
| 14′ | $Pb(Zr_{0.52}Ti_{0.48})O_3$ plus p.15 wt. percent MnO plus 0.15 wt. percent $Cr_2O_3$. | Room temp.<br>100° C. | 45<br>61 | 1,080<br>1,170 |
| 15′ | $Pb(Zr_{0.52}Ti_{0.48})O_3$ plus p.20 wt percent MnO plus 0.15 wt. percent $Cr_2O_3$. | Room temp.<br>100° C. | 46<br>57 | 1,060<br>1,150 |
| 16′ | $Pb(Zr_{0.52}Ti_{0.48})O_3$ plus 0.50 wt. percent MnO plus 0.15 wt. percent $Cr_2O_3$. | Room temp. | 45 | 970 |

[1] Denotes equivalent amount of $MnO_2$ was incorporated in lieu of MnO.

A comparison between samples No. 1 and No. 10 evinces the incorporation of only 0.10 weight percent $IrO_2$ is already effective for an improvement in $k_r$. Further, a comparison between samples No. 11 through No. 16 and No. 1 or No. 2 demonstrates that both $k_r$ and $Q_m$ are markedly improved by the coexistence of MnO and $IrO_2$. It can further be noted that by comparing samples No. 11 and No. 12 poling at 100° C. is considerably advantageous over poling at room temperature for improvement of $k_r$, but the value of $Q_m$ is substantially unaffected by the difference in the poling temperature.

Table IV shows similar results with $Cr_2O_3$ in lieu of $IrO_2$.

Table V shows the experimental results with ceramic products consisting of lead titanate zirconate expressed as $Pb(Zr_{0.52}Ti_{0.48})O_3$ 0.20 wt. percent $IrO_2$, and varying amounts of MnO..

A comparison between samples No. 1 and No. 17 shows that the incorporation of 0.20 weight percent $IrO_2$ alone is effective for an improvement in $k_r$. Further, a comparison between samples No. 18 through No. 21 and sample No. 1 or No. 17 shows both $k_r$ and $Q_m$ can be markedly improved by incorporation of MnO and $IrO_2$ as coexistent additives.

TABLE V

| No. | Compositional formula | Poling temperature | $k_r$ Percent | Q |
|---|---|---|---|---|
| 17 | $Pb(Zr_{0.52}Ti_{0.48})O_3$ plus 0.20 wt. percent $IrO_2$. | Room temp.<br>100° C. | 59<br>58 | 35<br>40 |
| 18 | $Pb(Zr_{0.52}Ti_{0.48})O_3$ plus 0.01 wt. percent MnO plus 0.20 wt. percent $IrO_2$. | Room temp.<br>100° C. | 61<br>57 | 45<br>46 |
| 19 | $Pb(Zr_{0.52}Ti_{0.48})O_3$ plus 0.05 wt. percent MnO plus 0.20 wt. percent $IrO_2$. | Room temp. | 60 | 73 |
| 20 | $Pb(Zr_{0.52}Ti_{0.48})O_3$ plus 0.20 wt. percent MnO[1] plus 0.20 wt. percent $IrO_2$. | Room temp. | 62 | 56 |
| 21 | $Pb(Zr_{0.52}Ti_{0.48})O_3$ plus 0.30 wt. percent MnO plus 0.20 wt. percent $IrO_2$[2]. | Room temp. | 60 | 43 |

[1] $MnO_2$ was incorporated in amounts equivalent to 0.20 wt. percen MnO.
[2] $Ir_2O_3$ was incorporated in amounts equivalent to 0.20 wt. percen $IrO_2$.

Table VI shows the experimental results with ceramic products consisting of lead titanate zirconaate expressed as $Pb(Zr_{0.52}Ti_{0.48})O_3$, 0.20 weight percent MnO and $Cr_2O_3$ in varying amounts.

A remarkable increase in the value of both $k_r$ and $Q_m$ for samples Nos. 18′ and 19′ subjected to poling at 100° C. over the sample of 17′ subjected to poling at 100° C is readily evident from this embodiment. Further, it i noted that although any one of the values of $k_r$ for samples Nos. 20′ through 22′ subjected to poling at room temperature is less than the value of $k_r$ for the sampl No. 17′ containing MnO alone, any one of the corresponding values of $Q_m$ for the former shows a marked increase over the value of $Q_m$ for the latter.

TABLE VI

| No. | Compositional formula | Poling temperature | $k_r$ Percent | Q |
|---|---|---|---|---|
| 17′ | $Pb(Zr_{0.52}Ti_{0.48})O_3$ plus 0.20 wt. percent MnO. | Room temp.<br>100° C. | 60<br>64 | 3<br>3 |
| 18′ | $Pb(Zr_{0.52}Ti_{0.48})O_3$ plus 0.20 wt. percent MnO plus 0.01 wt. percent $Cr_2O_3$. | Room temp.<br>100° C. | 35<br>67 | 5<br>5 |
| 19′ | $Pb(Zr_{0.52}Ti_{0.48})O_3$ plus 0.20 wt. percent MnO plus 0.02 wt. percent $Cr_2O_3$. | Room temp.<br>100° C. | 31<br>67 | 5<br>5 |
| 20′ | $Pb(Zr_{0.52}Ti_{0.48})O_3$ plus 0.20 wt. percent MnO[1] plus 0.10 wt. percent $Cr_2O_3$. | Room temp.<br>100° C. | 44<br>58 | 1,2<br>1,2 |
| 21′ | $Pb(Zr_{0.52}Ti_{0.48})O_3$ plus 0.20 wt. percent MnO plus 0.20 wt percent $Cr_2O_3$. | Room temp. | 58 | 1,1 |
| 22′ | $Pb(Zr_{0.52}Ti_{0.48})O_3$ plus 0.20 wt. percent MnO plus 0.30 wt. percent $Cr_2O_3$. | Room temp. | 45 | 1,0 |

[1] $MnO_2$ was incorporated in amounts equivalent to MnO.

Table VII shows the experimental results with piezo electric ceramics consisting of lead titanate zirconat $Pb(Zr_{0.52}Ti_{0.48})O_3$ as the principal constituent compo nents, 0.15 weight percent MnO, and 0.00, 0.05, and 0. weight percent $Cr_2O_3$ as the coexistent additives.

TABLE VII

| No. | Compositional formula | Poling temperature | $k_r$ Percent | Q |
|---|---|---|---|---|
| 23′ | $Pb(Zr_{0.52}Ti_{0.48})O_3$ plus 0.15 wt. percent MnO. | Room temp.<br>100° C. | 69<br>68 | 2<br>3 |
| 24′ | $Pb(Zr_{0.52}Ti_{0.48})O_3$ plus 0.15 wt. percent MnO plus 0.05 wt. percent $Cr_2O_3$. | Room temp.<br>100° C. | 42<br>65 | 1,0<br>1,2 |
| 25′ | $Pb(Zr_{0.52}Ti_{0.48})O_3$ plus 0.15 wt. percent MnO plus 0.10 wt. percent $Cr_2O_3$. | Room temp.<br>100° C. | 48<br>67 | 1,1<br>1,1 |

The value of $k_r$ for any one of samples No. 24 and No. 25 subjected to poling at 100° C. becomes a little less than that for corresponding sample 23′ containing MnO alone, whereas the value of $Q_m$ for the former has increased markedly over that for the latter. It may be said therefore that these materials, notably No. 24 and No. 25, are adapted for ceramic filter elements for which particularly large values of $k_r$ are called or for transducer elements in mechanical filters.

It can be further noted that the value of $k_r$ for either of samples No. 24′ and No. 25′ subjected to poling at room temperature has been decreased markedly from that for corresponding sample No. 23′, whereas the value of $Q_m$ for the former has been markedly increased. It may be said therefore that these materials, notably No. 24 and No. 25 (subjected to poling at room temperature) are adapted for ceramic filter elements for which values of $k_r$ of this order are required.

The values of $k_r$ and $Q_m$ for a ceramic material consisting of lead titanate zirconate expressed as $$Pb(Zr_{0.52}Ti_{0.48})O_3$$

0.01 weight percent MnO, and 0.30 weight percent $IrO_2$ (sample No. 22) and subjected in poling at room temperature were 60% and 460, respectively.

The values of $k_r$ and $Q_m$ for a ceramic material consisting of the same principal constituent compositions as sample 22 and 0.30 weight percent $IrO_2$ (let this be called sample No. 23) were 52% and 325, respectively.

A comparison between these samples readily reveals that the incorporation of traces of MnO (e.g., 0.01 wt. percent) is effective for an improvement of both $k_r$ and $Q_m$. The corresponding values of $k_r$ and $Q_m$ for the same ceramic materials subject to poling at 100° C. remained substantially unchanged.

Table VIII shows the experimental results with piezoelectric ceramics consisting of PbO, $ZrO_2$, $TiO_2$ so that the generalized formula is:

$$Pb(Zr_xTi_{1-x})O_3$$

(for which $x$=0.50, 0.53, and 0.55) incorporating as coexistent additives 0.10 weight percent MnO and 0.10 weight percent $IrO_2$. All of these samples were subjected to poling at room temperature.

TABLE VIII

| No. | Compositional formula | $k_r$, percent | $Q_m$ |
|---|---|---|---|
| 24 | $Pb(Zf_{0.45}Ti_{0.55})O_3$ | 8 | 320 |
| 25 | $Pb(Zr_{0.45}Ti_{0.55})O_3$ plus 0.10 wt. percent MnO plus 0.10 wt. percent $IrO_2$. | 28 | 1,650 |
| 26 | $Pb(Zr_{0.50}Ti_{0.50})O_3$ | 27 | 350 |
| 27 | $Pb(Zr_{0.50}Ti_{0.50})O_3$ plus 0.10 wt. percent MnO plus 0.10 wt. percent $Ir_2O_2$. | 47 | 1,230 |
| 28 | $Pb(Zr_{0.53}Ti_{0.47})O_3$ | 41 | 300 |
| 29 | $Pb(Zr_{0.53}Ti_{0.47})O_3$ plus 0.10 wt percent MnO[1] plus 0.10 wt. percent $IrO_2$. | 62 | 970 |
| 30 | $Pb(Zr_{0.55}Ti_{0.45})O_3$ | 38 | 320 |
| 31 | $Pb(Zr_{0.55}Ti_{0.45})O_3$ plus 0.10 wt. percent MnO plus 0.10 wt. percent $IrO_2$. | 51 | 1,470 |

[1] $MnO_2$ incorporated in amounts equivalent to 0.10 weight percent $MnO_2$.

It can be noted that the values of $k_r$ and $Q_m$ for ceramic materials containing 0.10 weight percent MnO and 0.10 weight percent $IrO_2$ have been improved markedly over those for plain lead titanate zirconate in spite of the changes in the compositional ratio of Zr to Ti shown.

We claim:

1. A piezoelectric ceramic of the general formula $$Pb(Zr_xTi_ySn_z)O_3$$

wherein the subscripts denote mole fractions and have the following values: $x$=0–.9, $y$=.1–.6, $z$=0–.65, and $x+y+z=1.00$, said ceramic having incorporated therein a first additive of from .01 to .50 weight percent manganese monoxide and a second additive of 0.1 to .30 weight percent iridium dioxide, said first and second additives being coexistent in the ceramic.

2. The ceramic claimed in claim 1 with 0–25 atom percent lead replaced with one or more bivalent elements selected from the group consisting of calcium, strontium and barium.

3. The ceramic claimed in claim 1, wherein one or more of said manganese monoxide and iridium dioxide are replaced with, respectively, a magnesium compound other than manganese monoxide and an iridium compound other than iridium dioxide having the equivalent ion weight.

References Cited

UNITED STATES PATENTS

| | | | |
|---|---|---|---|
| 3,006,857 | 10/1961 | Kulcsar | 252—62.9 |
| 3,268,453 | 8/1966 | Ouchi et al. | 252—62.9 |
| 3,347,795 | 10/1967 | Akashi et al. | 252—62.9 |

TOBIAS E. LEVOW, Primary Examiner

R. D. EDMONDS, Assistant Examiner

U.S. Cl. X.R.

106—39